United States Patent

Bäumler

[11] Patent Number: 5,883,722
[45] Date of Patent: Mar. 16, 1999

[54] CONTROLLER FOR EDITING ENCODED IMAGE DATA

[75] Inventor: Ulrich Bäumler, Poing, Germany

[73] Assignee: Océ Printing Systems GmbH, Poing, Germany

[21] Appl. No.: 809,251
[22] PCT Filed: Sep. 13, 1995
[86] PCT No.: PCT/DE95/01287
§ 371 Date: Mar. 20, 1997
§ 102(e) Date: Mar. 20, 1997
[87] PCT Pub. No.: WO96/09611
PCT Pub. Date: Mar. 28, 1996

[30] Foreign Application Priority Data

Sep. 20, 1994 [DE] Germany ............ 44 33 536.9

[51] Int. Cl.⁶ ............................................. H04N 1/40
[52] U.S. Cl. ........................... 358/296; 358/401; 358/468
[58] Field of Search ............................. 358/296, 400, 358/401, 468, 300, 443, 444, 434; 395/101, 114, 115, 116

[56] References Cited

U.S. PATENT DOCUMENTS

| 4,912,659 | 3/1990 | Liang | 340/747 |
| 5,146,547 | 9/1992 | Beck et al. | 395/115 |
| 5,150,455 | 9/1992 | Morikawa et al. | |
| 5,157,765 | 10/1992 | Birk et al. | |
| 5,293,480 | 3/1994 | Miller et al. | 395/163 |
| 5,594,860 | 1/1997 | Gauthier | 395/115 |

*Primary Examiner*—Peter S. Wong
*Assistant Examiner*—Derek J. Jardieu
*Attorney, Agent, or Firm*—Hill & Simpson

[57] ABSTRACT

A controller for an electrographic printer or copier for editing encoded image data by bundling the image data into work packets which are then processed independently of one another. A plurality of raster modules handle individual work packets independently of one another. The raster modules access a resources memory which contains information on fonts and images, for example. A central resources memory unit administers the process.

8 Claims, 5 Drawing Sheets

CONTROLLER FOR EDITING ENCODED IMAGE DATA

BACKGROUND OF THE INVENTION

1. Field of the Invention

The present invention is directed to a controller for editing encoded image data in an electrographic printer or copier device.

2. Description of the Related Art

The editing ensues such that a character generator can generate a charge image on an intermediate carrier that is dependent on the image data. The encoded image data are transferred from a host or some other data processing system to the controller, as disclosed, for example, by U.S. Pat. No. 5,012,434, in the form of commands of a specific, standardized language. For example, PCL (Printer Control Language) of Hewlett Packard and IPDS (Intelligent Printer Data Stream) of IBM are such languages. The commands contain all data for constructing a page to be printed. In particular, these are positioning information for positioning characters and images on a page, information from which the font of individual characters are to be taken, link information to other masters such as, for example, forms, and the pixel data for specific images to be printed. With the assistance of the controller, the received image data are converted into pixels that are arranged matrix-like such that the image data can be forwarded row-by-row or column-by-column to a following character generator.

U.S. Pat. No. 5,157,765 discloses a method and an apparatus for editing an encoded image data stream into a pixel data stream for driving a printer. A division of the rastering work for editing a page onto a plurality of processors is proposed in order to save memory space and in order to use the available processor capacity with high efficiency. In a four-stage process, independent blocks of a page to be printed are first identified and stored. In the second step, the blocks are converted into objects and data accesses to frequently employed resources such as, for example, characters are organized. In the following process, the positions of the objects on the page to be edited are determined. In the last stage, the objects are rastered and edited into a rastered, full page.

An electrographic printer or copier device that contains an optical or magnetic character generator is disclosed, for example, by European Patent Document EP-0 403 476 B1. Both a character generator that deflects a laser beam as well as a character generator working with LED lines is thereby suitable as an optical character generator. Print data that is present in pixel form are converted with a character generator into an optical or magnetic image with which a photoconductive or, respectively, ferromagnetic layer of a continuously revolving charge storage drum or of a corresponding band-shaped intermediate carrier of the printer or copier device is exposed in order to generate a latent charge or, respectively, a magnetic field image. This image is developed in a known way and transfer-printed onto a recording medium.

A controller must exhibit a corresponding calculating and raster capacity that is dependent on the performance capability of the printer or copier device in which it is utilized. In standard fast printer and copier devices, 50 to 350 DIN A4 pages are printed per minute. Dependent on the specific performance of a printer, one is compelled to either utilize specific controllers for the respective printer or, on the other hand, to accept an over-dimensioning of the controller. The raster capacity is limited by the access times onto the memory and the calculating capacity is limited by the performance of the processor employed.

SUMMARY OF THE INVENTION

The present invention is based on an object of providing a controller for editing encoded image data in an electrographic printer or copier device that is constructed such that the performance capability of the controller can be matched to the respective demands of the printer or copier device in which it is utilized.

These and other objects and advantages of the invention are provided by a controller for editing encoded image data in an electrographic printer or copier device such that a character generator can generate a charge image on an intermediate carrier dependent on the image data, including an interface for receiving the encoded image data; a conversion unit that bundles the data contained in the encoded image data into work packets that can be processed independently of one another; a packet memory unit for packet-by-packet storage of the data; a packet administration unit for the work packets that is coupled to a plurality of raster modules for rastering image data and allocates the raster modules a respective work packet each; a resources memory unit for storing bit maps that are selectable on the basis of data contained in the work packets; at least one output unit for output of the image data present in pixel form to the character generator, a resources buffer memory allocated to each raster module; and a raster processor allocated to each raster module that has access to a virtual address space that comprises at least the actually physically present memory space of all resources buffer memories and of the resources memory unit.

The controller described above is further improved by a block-by-block division within the resources memory unit and the resources buffer memories, so that a data transfer between the memories always ensues in blocks. A virtual address space is preferably enlarged by a magnification factor v.

As an added feature, the controller has a conversion unit that converts the encoded image data into image data that can be processed by the raster modules and, in the form of a bit map, hands them over to a resources administration unit that deposits the bitmap in the resources memory unit. The preferred embodiment provides that the work packets that respectively contain the data of a complete page to be printed, whereby these data are composed of control information for positioning individual bit maps on the page, and data for locating a bit map in the resources memories.

The present invention also provides a method for editing encoded image data in an electrographic printer or copier device such that a character generator can generate a charge image on an intermediate carrier dependent on the image data, having the following steps: reception of encoded image data; bundling the data contained in the encoded image information into work packets that can be processed independently of one another having the size of a page to be printed; packet-by packet storing of data that characterize at least one work packet; allocating the work packets to a plurality of raster modules such that one work packet is transmitted to a respective raster module; selection of bit maps from a resources memory unit on the basis of the data contained in the work packets; mastering the work packet such that the selected bit maps are processed on the basis of positioning and control information contained in the work packet; output of the image data present in pixel form to the character generator, a resources buffer memory allocated to each raster module; and a raster processor allocated to each raster module that has access to a virtual address space that comprises at least the actually physically present memory space of all resources buffer memories and of the resources memory unit.

As a development of the method, raster modules respectively are provided with a packet buffer memory, a resources buffer memory and a raster processor, whereby the raster processor can access a virtual address space that is bigger than the available memory space actually physically existing given consideration of all resources buffer memories and the resources memory unit, reading a virtual address from the packet buffer memory; checking with reference to a table whether the virtual address has a physical address of the local resources buffer memory allocated to it; if not, requesting and transferring a data block from the corresponding memory that contains the data of the physical address; transfer of the data block into the local resources buffer memory and corresponding modification of the table entry; and reading and processing the data from the local resources buffer memory with the raster processor.

When enough memory space is not present for the transfer of the data block into the local resources buffer memory, the method follows the steps of: selection of a data block that is no longer needed from the local resources buffer memory; deleting the selected data block; and corresponding modification of the table entry.

With the assistance of the conversion unit, the encoded image data can be bundled into work packets that can be processed independently of one another. The work packets can each be respectively handed over to a raster module that can edit the image data in a printer suitable manner independently of neighboring raster modules. In this editing, the individual raster modules can access a resources memory unit that contains the bit maps of various fonts and specific bit maps of images to be reproduced. A simple administration of the resources is assured as a result of the central resources memory unit.

As a result of this arrangement, the editing of encoded image data is divided into two separate work steps. The first work step is selected in terms of its job amount such that it can be implemented very fast compared to the second work step. This makes it possible to supply a plurality of raster modules with work packets with the assistance of the conversion unit. Dependent on the performance capability of the copier or printer device in which the controller is utilized, a corresponding plurality of raster modules that work in parallel but independently of one another can be utilized, a scalability of the performance of the controller being thus achieved. A further advantage of the division of the controller into two work steps is that, when the language standard with which the encoded image data reach the interface of the controller is changed, only the conversion unit need be adapted to the standard. The other units of the controller can continued to be employed in an unmodified form.

Each raster module contains a packet buffer memory, a resources buffer memory and a raster processor. The raster processor can preferably access a virtual address space that is larger than the available memory space that is actually physically present when all resources buffer memories and the resources memory unit are considered. The overall memory requirement is minimized with the assistance of this virtual memory management. Each processor can access each memory location of the overall system even though it does not actually have the corresponding memory capacity locally available. As a result of the block-by-block data exchange, memory cells addressed in the successor access to similar addresses are locally available. The number of global memory accesses is thereby minimized.

A fragmentation of the physical memories is also avoided as a result of the feature in accord wherewith the virtual memory space is larger than the actually available physical memory space. The fragmentation of the memories arises in that the life span of requested memory blocks differs in length, i.e. some blocks are in turn released earlier in time, others later in time. At some time or other, the situation arises that arbitrarily scattered memory blocks that have not yet been released are present in the memory. The effect thereof is that larger interconnected memory blocks are no longer present. By selecting a larger virtual address space, the probability is extremely high that adequately large interconnected memory blocks can always be addressed.

BRIEF DESCRIPTION OF THE DRAWINGS

An exemplary embodiment of the present invention is explained in greater detail below with reference to the drawing. Thereby shown are.

DETAILED DESCRIPTION OF THE PREFERRED EMBODIMENTS

Figure 1:
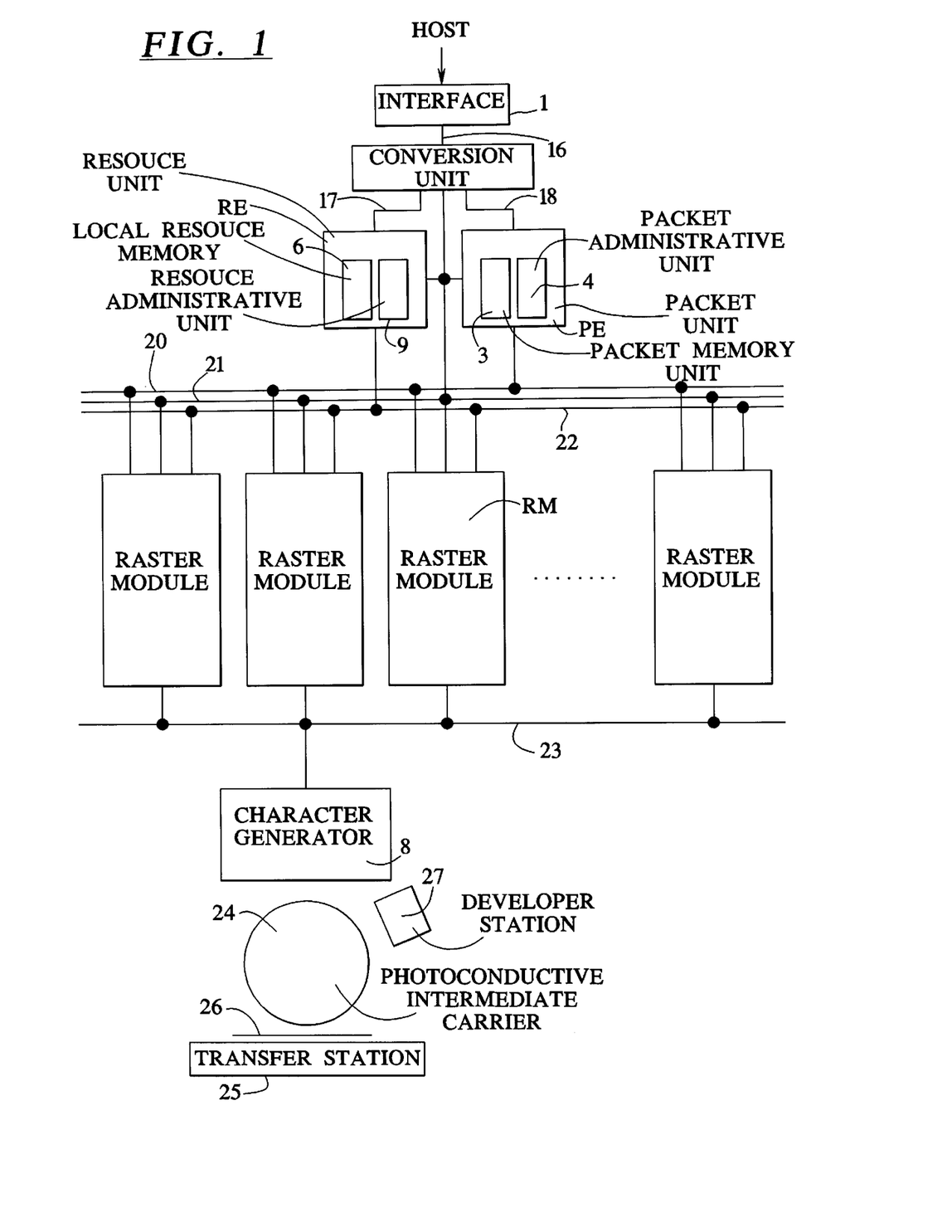
FIG. 1 is a block diagram of the function unit of an electrographic printer with controller.

The block diagram of FIG. 1 shows the function units of an electrographic printer or copier device that are contained therein for the transmission of the encoded image data deliver by a host onto a recording medium 26 as visible image. For example, paper in continuous or single sheet form serves as recording medium 26. The encoded image data are received by an interface 1 that is referred to below as HOST interface. This HOST interface 1 is connected by a HOST databus 16 to a conversion unit 2 that is referred to below as parser 2. The parser 2 converts the encoded image data into a format (described in greater detail below) that can be processed by the following function units.

The image data are thereby divided into two groups. A first group is formed by what are referred to as the resources that are transmitted from the parser 2 via a local resource bus 17 to a resources memory unit 6 and are stored in the latter. The resources memory unit 6 and the resources administration unit 9 allocated to this memory unit form the resources unit RE. The other group is formed by the work packets 30 that are transmitted via a local display list bus 18 to a packet memory unit 3 and deposited therein. The packet memory unit 3 and the packet administration unit 4 allocated to this memory unit form the packet unit PE.

Individual raster modules RM from a plurality of raster modules RM can be selected with the packet unit PE. The raster modules RM are coupled to the packet unit PE via a bus 20 that is referred to below as display list bus 20. The resources unit RE is coupled to the raster modules RM via a resources bus 22. The control information is exchanged between the raster modules RM, the parser 2, the resources unit RE and the packet unit PE via a control bus 21. This separation into individual busses is employed here for simplifying the specification. It is self-evident that arbitrary bus structures such as, for example, a multibus structure are employable.

On the basis of the data contained in the work packets and the data deposited in the resources memory 6, the raster modules RM edit the image data into pixel form. Since the data contained in a work packet 30 correspond to the information that are required for editing a complete page to be printed, every raster module RM edits a complete printed page into printing format.

For reproduction of the image data of a page on a recording medium 26, the raster modules RM are coupled to a character generator 8 via a pixel bus 23. For printing a page, a raster module RM supplies the pixel data to the character generator 8. The latter controls a laser beam or an LED line in a known way such that a latent charge image is generated on a photoconductive intermediate carrier 24. This charge image is developed in a known way in a developer station 27 with the assistance of toner particles and is transferred onto the recording medium 26 in a known way with a corona in a transfer printing station 25.

Given the described structure of the controller, two hardware modules, namely an I/O module containing the parser 2 and the packet unit PE and a raster module RM, are required in the minimal version. When, however, a controller is required whose performance capability should be limited to the performance capability of a raster module RM, then the I/O module and a raster module RM can also be combined in a hardware module.

Figure 2:
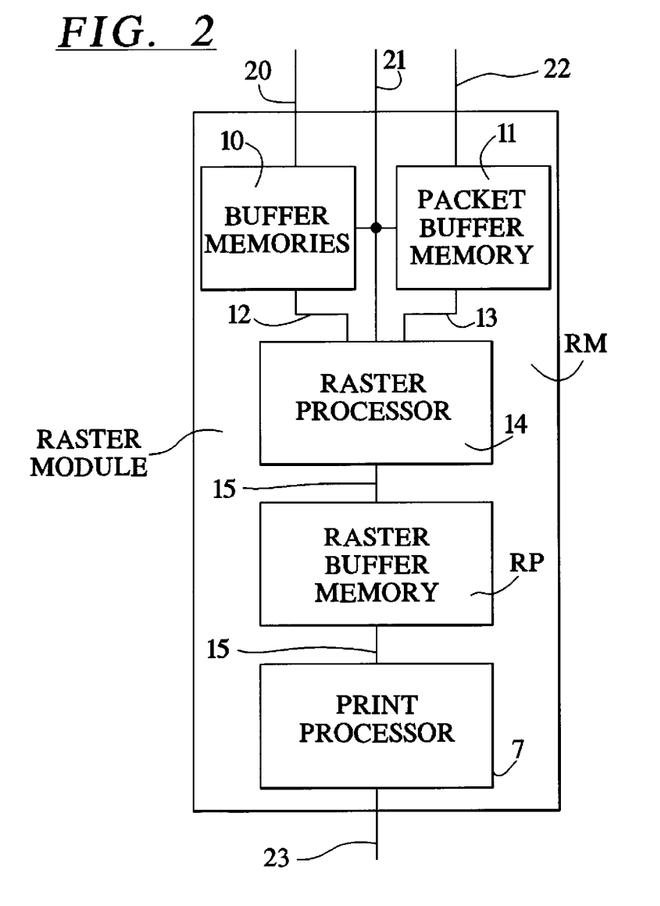
FIG. 2 is a block diagram of a raster module of a controller.

The raster modules RM are identically constructed according to FIG. 2. They each contain a packet buffer memory 11 coupled to the resources bus 22, a raster processor 14 coupled to the control bus 21 and to the buffer memories 10, 11 via local busses 12, 13, and a print processor 7 that is coupled to the raster processor 14 via a raster page bus and serves as an output unit 7. The raster processor 14 and the print processor or output unit 7 can access a raster buffer memory RP allocated to them independently of one another. This raster buffer memory RP serves for the intermediate storage of the raster result. The print processor 7 is coupled to the character generator 8 via the pixel bus 23.

The data supplied to the raster modules RM are edited by the parser 2. The parser 2 bundles work packets 30 from the image data received via the HOST interface 1 and decoded by the parser 2, these work packets 30 being independent of one another and respectively describing a complete page to be printed as display list 30. The work packets 30 are administered by the packet administration unit 4, deposited in the packet memory unit 3 and made available to the raster modules RM via the display list bus 20. Fonts and images are handed over to the resources administration unit 9 by the parser 2 via the local resources bus 17 and are deposited in the resources memory unit 6.

The nature of the data received from the HOST and what page they are respectively allocated to can be derived from the received, encoded data stream. For example, the parser 2 receives a command from which it can conclude that a new printed page is beginning. When a new page starts, control information that were sent from the HOST before the start of the new page must also be potentially attached to the work packet 30. For example, it can be required that what is referred to as an overlay that, for example, can be a company logo or a form must be attached to a page. Control information that the current page inherits from a preceding page must also be attached to the current page. For example, a font to be used can be inherited from one page to the next.

In the generation of the control information by the parser 2, the data received from the HOST are also checked for their plausibility and potential transmission errors. It is thereby guaranteed that all data handed over from the parser 2 to the following units RE, PE have already been checked for their validity and are correct. The further processing of the image information, accordingly, can no longer be disrupted by unprocessable data or the like.

The display list 30 is composed of a sequence of individual control information that are referred to below as metacommands 31, 32. The metacommands 31, 32 can be interpreted as an internal printer language. It thus becomes clear that the parser 2 is also used a print language converter. When, for example, the print language used by the HOST changes from PCL emulation to IPDS emulation, the controller can be adapted to this change by a replacement of the parser 2. The processes following the parser 2 need not be modified or only have to be modified to a slight extent.

Figure 3:
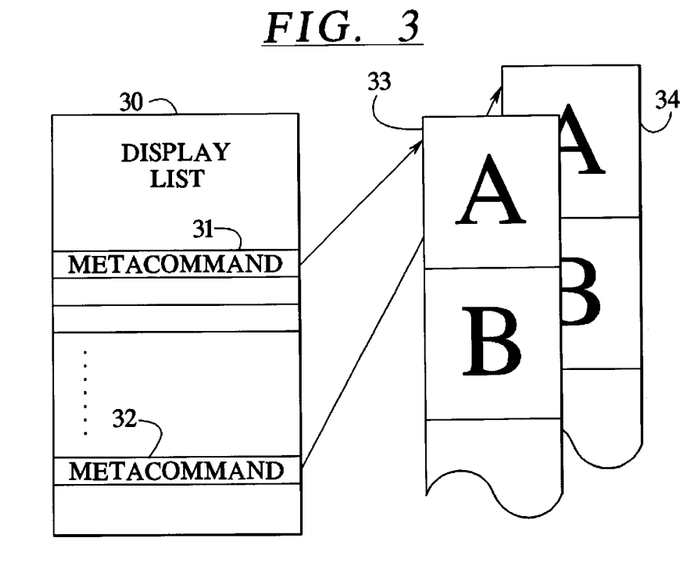
FIG. 3 is a schematic illustration of the allocation between work packet and resources.
Figure 4:
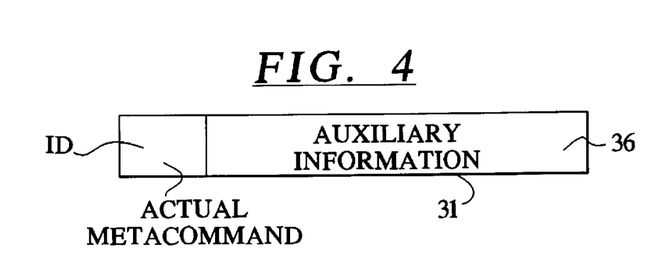
FIG. 4 is the schematic structure of a metacommand of a work packet.

The display list 30 is shown in FIGS. 3 and 4. An individual metacommand 31 is composed of the actual metacommand ID and auxiliary information 36 about this metacommand ID. For example, the actual metacommand ID reads "print an 'A'", and the address of the 'A' and the corresponding font 33 to be used are named as auxiliary information 36. Another display list entry 32 likewise reads "print an 'A'", and the address of the corresponding letter 'A' and the appertaining font 34 differing from the first-cited font 33 are indicated as auxiliary information.

An example of a display list entry in its byte sequence is shown below as an example.

| | |
|---|---|
| 20 | Actual metacommand ID for start of page |
| 00 50 00 00 | Offset of the page in X-direction, i.e. 50H dots from the left edge of the diode comb of the character generator 8 |
| 00 00 00 00 | Offset of the page in Y-direction, i.e. 0 dots from the upper edge of the page |
| 00 00 01 00 | Size of the page in X-direction. The page is 0100H big in X-direction. |
| 00 00 02 00 | Size of the page in Y-direction. The page is 0200H big in Y-direction. |
| 01 | Orientation of the page. The page is turned by 90 degrees relative to the paper running. |
| 21 | Actual metacommand ID for end of page |

The indicated example would effect the print-out of a blank page. The first, actual metacommand ID=20 defines that a new page is beginning. The page edges , the page size and the orientation of the printing are determined as auxiliary information 36. The page is in turn already ended with the following, actual metacommand ID=21 before a print order ensues.

Figure 5:
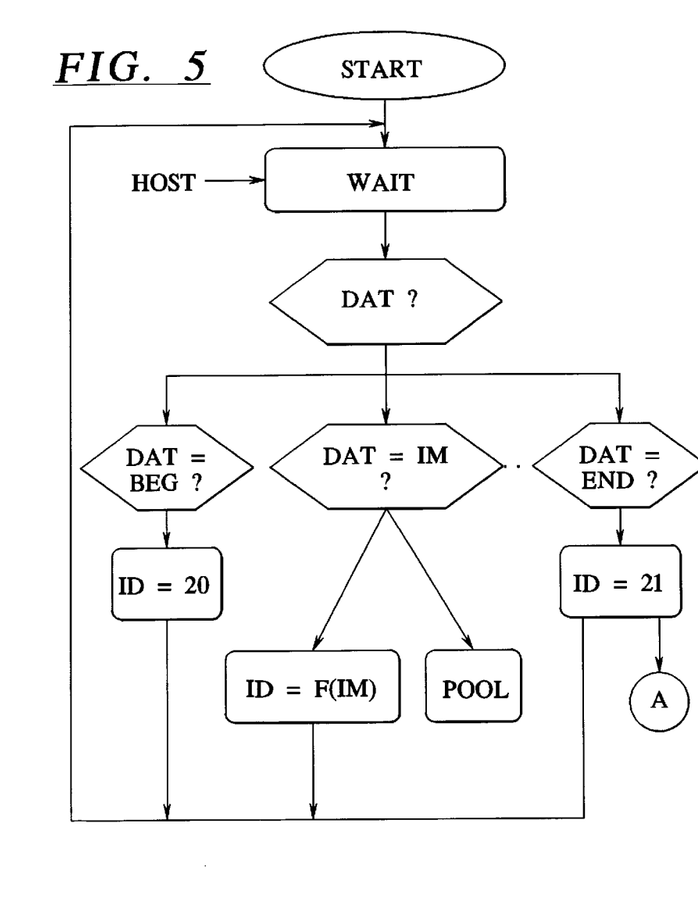
FIG. 5 is a flowchart of the method for converting encoded image data into work packets.

The inventive method is explained with reference to FIGS. 5 through 8. As shown in FIG. 5, the parser 2 wait for an encoded image data of the HOST after it starts. When the parser 2 receives data that are to be allocated to a page to be printed, it produces work packets in the display list 30 from these data. Received data DAT that contain a specific image pattern to be reproduced, what is referred to as a bit map, are conducted to the resources unit RE and are deposited thereat, as explained in greater detail below. Each work packet contains a sequence of metacommands 31, 32. The actual metacommand ID=20 is set at the page beginning BEG and the margin conditions of the page are entered as auxiliary information 36. When the metacommand 31 is generated at the beginning BEG of a page and transmitted to the packet memory unit 3, the parser 2 again waits for encoded image data from the HOST.

The parser 2 then extracts information that reference specific locations in the resources memory 6 from the data DAT received from the HOST that subsequently usually relate to the content of a page. When certain characters deposited in a font 33, 34 are to be printed, then the parser 2 generates a corresponding, actual metacommand ID and adds the starting address of the character IM in the resources memory unit 6 at which the character is deposited to it as auxiliary information 36. When a specific bit map IM is to be printed, then the parser 2 conducts this bit map IM to the resources unit RE and generates and actual metacommand ID with an auxiliary information 36 that references the starting address of the bitmap IM deposited in the resources unit RE. When the parser 2 recognizes the end END of a printed page from the image data received from the HOST, then it generates a metacommand 31, 32 that contains the actual metacommand ID=21. The parser 2 has thus produced a work packet and deposited it in the packet memory unit 3 as a display list 30. The parser 2 sends a message A to the packet administration unit 4.

Figure 7:
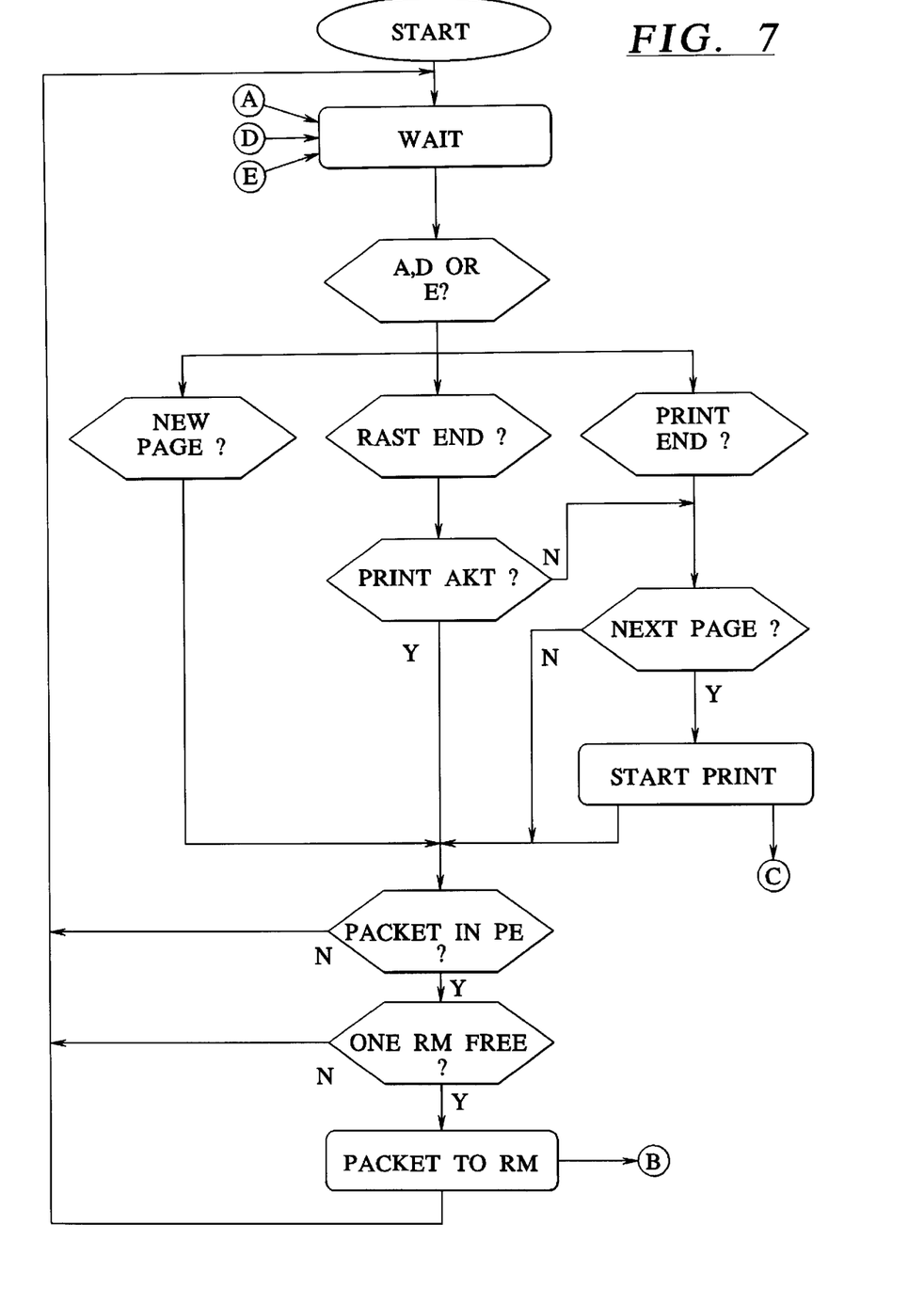
FIG. 7 is a flowchart of the method execution of the allocation of a work packet by a packet administration unit.

The packet administration unit 4 reacts to this message A in the way shown in FIG. 7. Beginning with a start time, the packet administration unit 4 waits for messages A,D,E from the parser 2, from the raster processor 14 and from the print processor 7. When the packet administration unit 4 has received the message A, in accord wherewith a work packet 30 for rastering is present in the packet memory unit 3, it checks to see if a raster module RM is free for processing the work packet. When this is not the case, the packet administration unit 4 waits until a raster module RM becomes free. The packet administration unit 4 then hands a message B over to the raster module RM. This message B contains the start address of the work packet in the display list 30.

Figure 6:
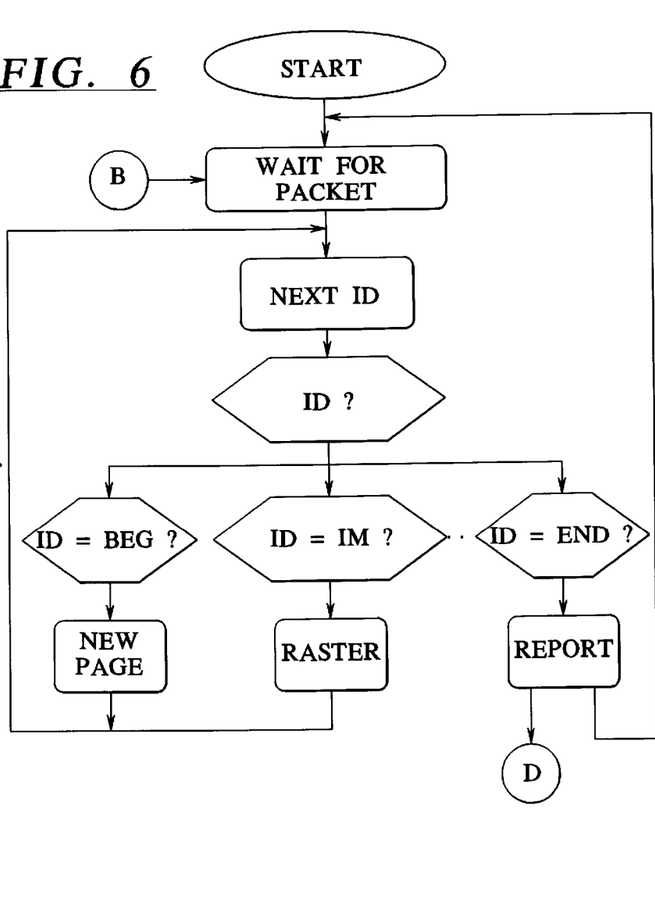
FIG. 6 is a flowchart of the method for rastering a work packet.

According to FIG. 6, the raster module RM waits for this start address D of the work packet. With reference to this start address B, the raster module RM now gets a part of the metacommands 31, 32 belonging to the work packet from the packet memory unit 3 via the display list bus. These metacommands 31, 32 are intermediately stored in the packet buffer memory 10. Via the local bus 12, the raster processor 14 successively accesses the metacommands 31, 32 and implements the required raster operations dependent on them. The first metacommand 31 contains the actual metacommand ID=20 for the beginning BEG of the page. In a known way that is not described here, the page to be rastered is subsequently edited in terms of size and alignment. The following metacommands 32 contain the start addresses of the bitmaps to be presented on the page. The required memory contents of the resources memory unit 6 determined by the start addresses are transmitted via the resources bus 22 into the resources buffer memory 11 of the raster module RM. The raster processor 14 receives these memory contents from the resources buffer memory 11 via the local bus 13. The page to be printed is thus rastered in a known way and the raster result is deposited in the raster buffer memory RP. When the raster processor 14 recognizes the end END of the work packet on the basis of the actual metacommand ID=20, then it transmits a corresponding message D to the packet administration unit 4 and waits for the communication of a new start address B of a new work packet.

When the packet administration unit 4 (FIG. 7) receives the message D about the end of the rastering of a work packet, then it checks whether a print processor 7 is currently executing a print order from one of the raster modules RM. When this is the case, the packet administration unit 4 checks whether a new work packet to be processed is present in the packet memory unit 3 and whether a raster module RM is ready for rastering the work packet. When this is the case, it hands this new work packet over to the corresponding raster module RM and checks again to see whether a print processor 7 is active. When this is not the case, the packet administration unit 4 checks whether the next page that is supposed to be supplied to the character generator 8 is available in one of the raster buffer memories RP of the raster modules RM. When this is not the case, the packet administration unit 4 initiates the rastering of a new work packet when the afore-mentioned, corresponding conditions are met. When, given a check to see whether the next page to be printed is present in the raster buffer memory RP of one of the raster modules RM, there is a positive acknowledgment information, then the corresponding raster module RM is prompted to print out the page.

Figure 8:
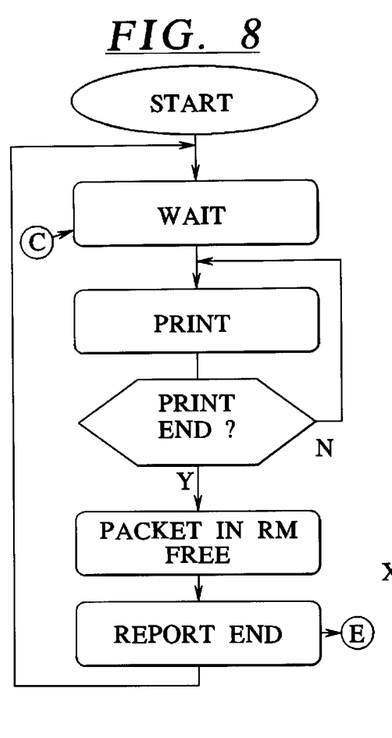
FIG. 8 is a flowchart of the method execution of the printing process for handing print data over to the character generator.

The print processor 7 of this raster module RM receives the corresponding command according to FIG. 8. As a consequence thereof, the print processor 7 forwards the raster image to the pixel bus 23 row-by-row or column-by-column. The print processor 7 thereby constantly checks whether the end of the page has been reached. When this page end is reached, the print processor 7 releases the memory location in the raster buffer memory RP occupied by the page that was just printed out for being written anew. Subsequently, the print processor 7 outputs an end of printing message E to the packet administration unit 4. The latter recognizes the end of printing message E and allows the print processor 7 of the raster module RM that contains the next page to be printed to output this page onto the pixel bus 23.

The data exchange between the resources unit RE and the packet unit PE with the raster modules RM ensues via the display list bus 20 and the resources bus 22. The control information therefor are exchanged via the control bus 21. According to FIG. 9, the data exchange ensues upon employment of a virtual address space AYK that is imaged onto a physical address space E1, E2, E3.

Figure 9:
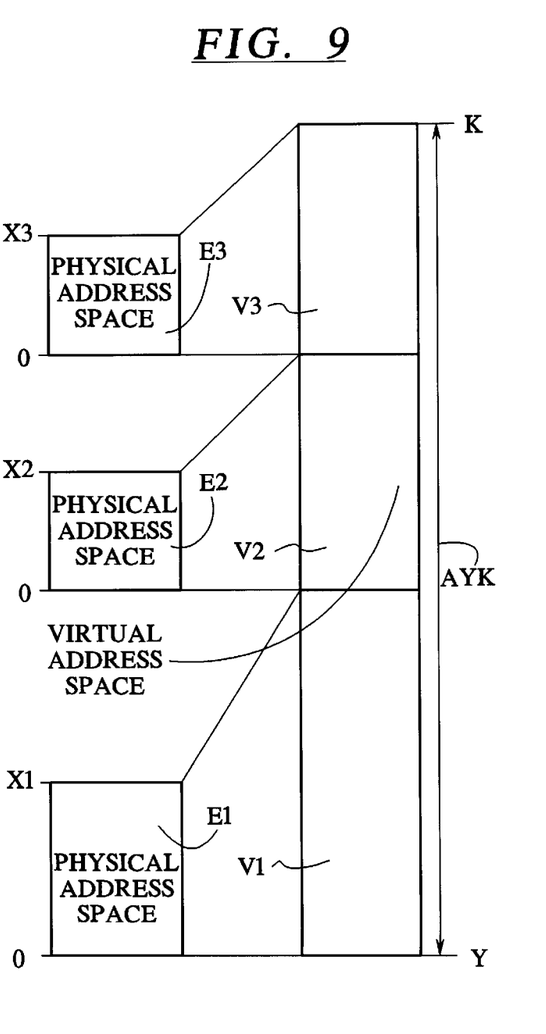
FIG. 9 is a schematic illustration of the allocation of a virtual address space to a physical address space.

Every hardware module in which at least one of the function units RE, PE, RM of the controller is arranged has a physical address space E1, E2, E3 allocated to it that begins at the same start address 0 and ends at an end address X1, X2, X3. In order to make each memory address within the controller unambiguous, the addresses AYK, that are referred to during ongoing operations, are decoupled from the addresses E1, E2, E3 of the physical memory. A virtual address space AYK is introduced for this purpose. A specific section V1, V2, V3 in the virtual address space AYK is thereby allocated to each hardware module of the function units RE, PE, RM. The conversion of the virtual addresses V1, V2, V3 onto the physical addresses E1, E2, E3 is undertaken by the memory management unit (MMU) of the respective processors of the function units RE, PE, RM.

The memories of the function units RE, PE, RM are divided into blocks of equal lengths that are referred to as "page" below. A standard size for such a "page" is 4 kbyte. Via tables, every physical "page" can have a different, basically arbitrary virtual address Y through K allocated to it. The access of programs via the virtual address Y through K onto the corresponding address 0 through X in the physical address space E1, E2, E3 is completely transparent since the processors quasi-automatically undertake the conversion via tables.

A fragmentation of the memory ensues in dynamic operation due to the time-variable release of memory blocks. The fragmentation is prevented by application of the virtual addressing in that the virtual address space AYK is selected larger than the physical address space E1, E2, E3. Each physical address space E1, E2, E3 of a function unit RE, PE, RM is imaged onto a respectively larger virtual address space V1, V2, V3. The entire virtual address space V1, V2, V3 onto whose addresses each of the individual function units can access directly extends from an address Y to an address K. Thereby valid is:

$$K=Y+v*(X1+X2+X3)$$

with v as a magnification factor for the physical address space E1, E2, E3. Given employment of a virtual address space AYK that is twice as big as the physical address space E1, E2, E3—v=2 is valid—, function disruptions when rastering image data due to memory fragmentation are completely avoided with high probability.

The data exchange between the system units RE, PE, RM then ensues via what is referred to as "paging". Normally, "paging" is utilized together with the virtual addressing in operating systems in order to overcome the limits of the physical memory. This occurs in that, upon the condition that there is no longer any physical memory in the system, the content of a "page" or a plurality of "pages" of a first memory is transferred out to a second memory. The second memory is thereby often a hard-disk storage. What "pages" are transferred out and what virtual address space these "pages" cover is deposited in tables. These tables are processed by the memory administration and interpreted by the memory management unit (MMU) of the processor at every access onto the memory. When such a "page" that has been transferred out is accessed, an interrupt is triggered that starts an interrupt service routing for reacquisition of the transferred "page". First, space is created in the first memory by transferring unneeded "pages" out from the first memory into the second memory. This space is then filled with the needed "pages". Subsequently, the tables of the MMU are correspondingly updated and the desired access to the "pages" can ensue.

This functionality of commercially obtainable processors is now employed in modified form for the data transfer between the system units PE, RE, RM of the controller. Data that are not locally present in the memory 10, 11 of a function module RE, PE, RM are accessed with the assistance of "paging". When, for example due to a start address of a bit map contained in the metacommand 31, the raster processor 14 of a raster module RM, E2 accesses its packet buffer memory 10, then its MMU initially determines whether the virtual address Y through K cited in the metacommand 31 is allocated to a locally available physical address 0 through X2. When this is not the case, the corresponding interrupt service routine is triggered. This interrupt service routine effects the transfer of the needed "page" to the packet buffer memory 10 of the raster module RM. The "page", for example, is located in the resources memory unit 6. The interrupt service routine stops the program run of the raster processor 14 and makes sure that the program can be continued at the same point later. With the assistance of a table, the memory management MMU of the raster processor 14 determines the physical address 0 through X1 in the resources memory unit 6 of the resources unit RE, E1 under which the "page" is deposited. The memory management MMU of the raster module RM then communicates via the control bus with the memory management MMU of the resources administration unit 9. The needed "page" is requested by this communication. The resources administration unit 9 then sends a copy of the requested "page" to the requesting raster module RM via the resources bus 22. There, the data of the "page" are stored in the resources buffer memory 10, E2 under a locally present, physical address 0 through X2. The table entry in the memory management MMU of the raster module RM is correspondingly updated and the raster processor 14 is prompted to continue the program run.

When too little space is present in the packet buffer memory 10 of the raster module RM for entry of the "page" transferred from the resources memory unit 6, the memory management unit MMU selects that "page" contained in the packet puffer memory 10 that was not needed for the longest time. The selected "page" is declared invalid and overwritten by the data of the new "page". The selected "page" can be simply deleted because it is only a copy from the resources memory unit 6. A time-consuming transfer of this "page" can therefore be foregone, the raster process being additionally accelerated as a result thereof.

It is self-evident that, given a corresponding need, the resources memory unit 6 can also be entirely or partly transferred out in a packet buffer memory 10 of a raster module 10. For enhancing the rastering capacity of a controller, for example, it is possible to insert a raster module RM with an enlarged resources buffer memory 11 into the controller. As a result thereof, the capacity of the controller for accepting bit maps can be increased without additional intervention in the resources unit RE.

A "cache" effect is also achieved by applying the "paging" in the data exchange between the system units RE, PE, RM. When requesting needed data, data blocks, i.e. "pages" of a defined size, are exchanged between the units RE, PE, RM. However, a "page" contains more data than are required for the execution of the next command when rastering. For example, an 'A' of a specific font 33 is to be written given the current command. The 'A' is contained in a "page" that also contains the raster information for the letters B, C, D and E. When, with the next command, a 'C' of the same font 33 is to be inserted on the page to be rastered, then this 'C' is already locally available in the resources buffer memory 11. When another letter of the font 33 that is not contained in the first "page" is to be rastered, the corresponding "page" is fetched in the local resources buffer memory 11. The entire font 33 is transferred onto the local resources buffer memory 11 in this way. Texts to be printed in this one font 33 can then be rastered by the raster module RM without making further demands on the resources bus 22. On the basis of the condition that it is always the "page" that was no longer required for the longest time that is overwritten, the "pages" allocated to the font 33 are only deleted when the font 33 is no longer required.

It is also possible, given the request for a currently needed "page", to also request further, following "pages" at the same time. A complete font 33, for example, can thus be fetched into the resources buffer memory 11 of a raster module RM with a single request of an interrupt service routine.

The transfer of work packets between the packet unit PE and a raster module RM ensues in an analogous way. The raster processor 14 of a raster module RM receives the virtual start address Y' through K' of the work packet in the display list 30. A "page" that contains the start address of the work packet 30 is transferred into the packet buffer memory 10 with the assistance of the interrupt service routine. A plurality of metacommands 31, 32 is contained in this "page". A new interrupt is triggered only after the processing of all of these metacommands 31, 32, and the interrupt service routine is triggered for obtaining the successor "page". The load on the display list bus 20 is correspondingly low.

What is referred to as a memory pool must be generated when bitmaps, for example a font 33, 34, or a graphic to be presented on a page are to be stored in the resources memory unit 6 of the controller. Such a memory pool has the following properties.

A generated pool receives an identifier that is unambiguous within the controller. The size of the pool is conditioned by the "paging", a multiple of a single "page" (for example, 4 Kbytes).

Individual memory sections can be allocated to the pool or released within a generated pool. The size of the allocated memory areas can lie between a byte and the largest interconnected physical memory area within the pool. The function unit RE, PE, RM in which the pool is generated is determined by a parameter. The memory management unit MMU of the respective function unit RE, PE, RM makes the necessary functions available that are required for the allocation or the release of memories. When a pool is released, all memory areas lying within the pool and allocated to this pool are also released.

An ownership right is defined for a pool. The owner of the pool is initially who generated the pool. This ownership right can be given away and reacquired. The owner of the pool is allowed to implement all defined operations on this pool. An access of non-owners to the pool leads to an error. When the ownership right to the pool is surrendered, then there is no longer an owner for the pool. In this case, every function unit RE, PE, RM has a right to access the pool in reading fashion.

When, for example, a graphic proceeds via the HOST to the parser 2, then the parser 2 activates the resources administration unit 9. The resources administration unit 9 generates a pool in the resources memory unit 6 and assigns an identifier to this pool. It forwards this identifier to the parser 2 that uses it for producing the metacommand 31. A raster module RM can access the pool later with the assistance of this metacommand. The resources administration unit 9 now has control over the pool and can enlarge or, respectively, reduce its size as needed by allocating or releasing memory space. The bit map received from the HOST is stored in this pool. When the entire bit map is contained in the pool, the resources administration units 9 relinquishes control over the pool. Any arbitrary unit RE, PE, RM can now access the pool in reading fashion. When modifications are to be subsequently undertaken at the pool, control of the pool can be reacquired by a specific request and the modification can be undertaken. Such a modification, for example, can be the release or deletion of the pool. When a pool is deleted, it is seen to at the same time that all copies of the pool as well as parts of the pool are likewise deleted and declared invalid. Another access to the deleted pool then leads to an error message.

The output of the rastered image data from the raster module RM via the pixel bus 23 to the character generator 8 ensues in the following way. The print processor 7 of a raster module RM that contains the rastered image data for the next page to be printed is informed by the packet administration unit 4 that it is to output a specific page onto the pixel bus 23 given the next request from the pixel bus 23. The following interrupt on the pixel bus 23 is correspondingly received by this print processor 7. The print processor 7 transmits the required data for reading out the entire page to the control of the pixel bus 23, whereupon this reads the entire page from the raster buffer memory RP of the raster module RM. With a further interrupt, the pixel bus 23 signals the print processor 7 the successful readout of the page, whereupon the print process is ended.

Although other modifications and changes may be suggested by those skilled in the art, it is the intention of the inventor to embody within the patent warranted hereon all changes and modifications as reasonably and properly come withing the scope of his contribution to the art.

I claim:

1. A controller for editing encoded image data in an electrographic printer or copier device such that a character generator of the printer or copier can generate a charge image on an intermediate carrier that is dependent on image data, comprising:

an interface for receiving encoded image data;

a conversion unit that bundles data contained in the encoded image data into work packets that can be processed independently of one another;

a packet memory unit for packet-by-packet storage of the data;

a packet administration unit for the work packets that is coupled to a plurality of raster modules for rastering the image data and allocates the raster modules a respective work packet each;

a resources memory unit for storing bit maps that are selectable on a basis of data contained in the work packets;

at least one output unit for output of the image data present in pixel form to the character generator;

a resources buffer memory allocated to each of said raster modules; and a raster processor allocated to each of said raster modules that has access to a virtual address space that comprises at least actually physically present memory space of all said resources buffer memories and of the resources memory unit.

2. A controller according to claim 1, wherein said resources memory unit and the resources buffer memories are divided into blocks so that a data transfer between the resources memory unit and the resources buffer memories always ensues in blocks.

3. A controller according to claim 1, wherein said virtual address space enlarged by a magnification factor v of actually physically present memory space is of all said resources buffer memories and of the resources memory unit.

4. A controller according to claim 1, further comprising:

a conversion unit that converts the encoded image data into image data that can be processed by the raster modules and, in the form of a bit map, hands them over to a resources administration unit that deposits the bitmap in the resources memory unit.

5. A controller according to claim 1, wherein said work packets contain data of a complete page to be printed, said data including:

control information for positioning individual bit maps on the page; and data for locating a bit map in the resources memories.

6. A method for editing encoded image data in an electrographic printer or copier device such that a character generator can generate a charge image on an intermediate carrier that is dependent on the image data, comprising the following steps:

receiving encoded image data;

bundling the data contained in the encoded image data into work packets that can be processed independently of one another having the size of a page to be printed;

packet-by-packet storing of data that characterize at least one work packet;

allocating the work packets to a plurality of raster modules such that one work packet is transmitted to a respective raster module;

selecting bit maps from a resources memory unit on a basis of the data contained in the work packets;

rastering the work packet such that the selected bit maps are processed on a basis of positioning and control information contained in the work packet;

output of the image data present in pixel form to the character generator;

allocating a resources buffer memory to each raster module;

allocating a raster processor to each raster module that has access to a virtual address space that comprises at least the actually physically present memory space of all resources buffer memories and of the resources memory unit.

7. A method according to claim 6, wherein each of said raster modules contains a packet buffer memory, a resources buffer memory and a raster processor, whereby the raster processor can access a virtual address space that is bigger than the available memory space actually physically existing given consideration of all resources buffer memories and the resources memory unit, comprising the following steps:

reading a virtual address from the packet buffer memory;

checking with reference to a table whether a virtual address has a physical address of a local resources buffer memory allocated to it;

if not, requesting and transferring a data block from the corresponding memory that contains the data of the physical address;

transferring the data block into the local resources buffer memory and modifying a table entry accordingly; and reading and processing the data from the local resources buffer memory with the raster processor.

8. A method according to claim 7, wherein when enough memory space is not present for the transfer of the data block into the local resources buffer memory, performing the following steps:

selection of a data block that is no longer needed from the local resources buffer memory;

deleting the selected data block; and corresponding modification of the table entry.

* * * * *